Figure 1:
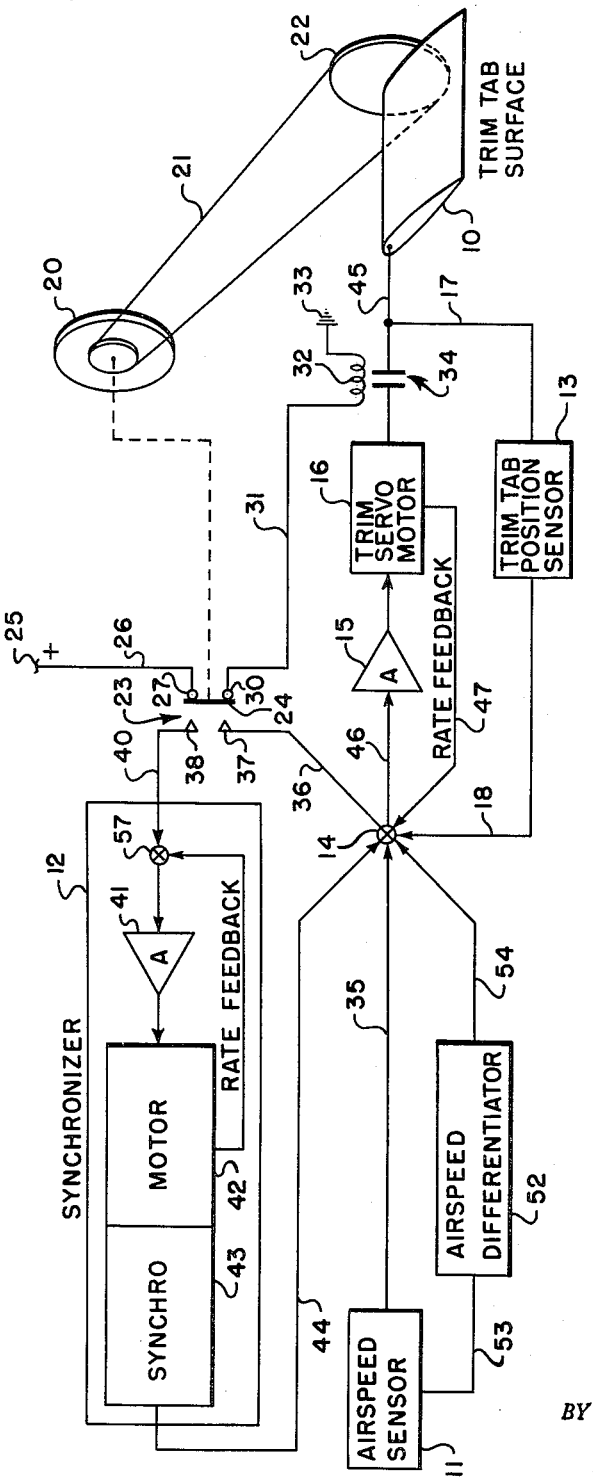

March 6, 1962  J. HONG ETAL  3,023,985
TRIM COMPENSATOR
Filed July 9, 1959  2 Sheets-Sheet 2

INVENTORS
JAMES HONG
RUSS G. CATHAWAY
HEINZ K. RICHTER
JAMES A. HASTINGS
BY
George C. Sullivan 3,023,985
TRIM COMPENSATOR
James Hong, Sherman Oaks, Russ G. Cathaway, Van Nuys, Heinz K. Richter, Los Angeles, and James A. Hastings, Sun Valley, Calif., assignors to Lockheed Aircraft Corporation, Burbank, Calif.
Filed July 9, 1959, Ser. No. 825,924
5 Claims. (Cl. 244—77)

This invention relates to flight controls of aircraft and more particularly to control of trim tabs to alter force exerted on cockpit controls. In the manual control of aircraft it is desirable that the pilot have a natural or proportional feel of the attitude and air speed of the aircraft at all times. Any change in speed or attitude should be reflected through the controls in the cockpit to the pilot so that the pilot is apprised at all times of the condition of the aircraft. This change in speed or attitude is reflected in pressure on the flight controls known as "stick-force." The relation of stick-force to air speed is considered important enough that the Government has by law required that before an aircraft is declared airworthy, in 14 CFR 4b.151(c), "the stable slope of stick-force curve vs. speed shall be such that any substantial change in speed is clearly perceptible to the pilot through a resulting change in stick-force."

An aircraft is said to be in trim when its controls are so adjusted that it will maintain a desired attitude of flight. Trim speed of an aircraft is that speed at which pressures reflected by the primary control surfaces to the cockpit controls will be neutral. An aircraft in its trimmed attitude will be at its trim speed. Departures from trim speed will result in differing pressures on the primary control surfaces which are reflected to the cockpit controls and are perceptible as a change in stick-force. The primary control surface for pitch control around the lateral axis of an aircraft is the elevator which is hinged to the horizontal stabilizer. Usually hinged to the aft edge of the elevator is a small auxiliary control surface called a trim tab. Deflection of the trim tab up or down will cause deflection of the elevator in the opposite direction which results in a change of attitude of the aircraft. It is through use of a trim tab that an aircraft is trimmed and trim speed is set.

Deflection of the trim tab upwardly, resulting in down deflection of the elevator, decreases the attitude of the aircraft and increases the trim speed. That is, the trim speed at which the control pressures will be neutral is increased. The usual manner to set a new trim attitude and trim speed is to adjust the elevator and consequently the attitude of the aircraft by movement of the stick which is directly connected to the elevator surface. This will require manual pressure by the pilot on the stick. If it were desired to maintain the new attitude and speed without the use of trim tabs the pilot would be required to maintain a constant pressure. Instead of this, upon reaching trim speed the pilot will trim stick pressures to neutral by means of the trim tab. Thus, instead of maintaining force on the elevator by means of the cockpit stick or controls, the force is supplied by the deflected trim tab. Since the elevator is connected by cables or other direct means to the stick in the cockpit, any change in force upon the elevator surface will be reflected in change of force on the stick. As the air speed changes, the forces upon the elevator will change; thus the forces upon the stick will change. Therefore, increase or decrease from the trim speed will cause a change in pressure on the elevator control surface which is reflected to the stick and perceived by the pilot. The pilot will thus have a constant indication of changes from the trim speed by reason of changes in stick-force.

Change in deflection of the elevator control surface in the air-stream will also change the pressures reflected to the stick. For instance, if the elevator is deflected a greater amount into the air-stream, increased pressures will be reflected to the stick. By the same reasoning, deflection of the trim tabs into the airstream a greater amount will be reflected in increased pressures through the elevator to the stick. Thus, there are two methods by which the pilot will perceive the change in stick force. The first is through a deviation from a set trim speed and the second is as a result of deflection of the trim tab. In the first instance the pressures sensed would be as a result of departure from trim speed. In the second, assuming that actual speed remained constant while the trim tabs were deflected, the reflection in force would be a result of change in the trim speed itself inasmuch as deflection of trim tab will increase or decrease the trim speed in the manner described above.

In the interest of safety it is desirable that the pilot perceive any change in speed from the trim speed. It is for this reason that the Government has required in 14 CFR 4b.151(c) that before an aircraft is declared airworthy the stick-force vs. speed curve shall have a stable slope so that any substantial change in speed will be clearly perceptible to the pilot through a resulting change in stick-force. As speed decreases from trim speed the pilot should perceive a pull on the stick. Lessening of pressures upon the trim of the elevator control surface will be reflected in a forward movement of the stick, or pull, as the pilot senses it. An increase in speed from the trim speed will result in a pushing pressure on the stick. The stick will tend to push toward the pilot. Thus the pilot will recognize that when there is a pull force on the stick, the aircraft is slowing from its trim speed, and when there is a push force on the stick, the aircraft is increasing speed. The larger the decrease in speed from the trim speed the larger will be the pull experienced, and the larger the increase from trim speed the larger the push that will be experienced. Thus the stick-force pressures experienced will assume a proportional relationship with respect to the trim speed.

Earlier, slower model aircraft experienced this proportional characteristic of speed vs. stick-force. However, as faster aircraft were developed it was found that some place within the speed spectrum of some aircraft there occurred a phenomenon called a stick-force reversal. At some point in that speed spectrum, instead of the expected push force as speed increased from the trim speed, there was experienced a pull force. With the force reversal phenomenon back pressure or pull force is experienced as speed decreased from the point of force reversal, and as speed increased beyond the force reversal speed, back pressure is again experienced. Thus, unless the pilot had some other indication of speed change, he would normally feel that the aircraft speed was decreasing when in fact it was increasing speed. In aircraft which have this force reversal characteristic it is imperative that some means be provided to alter the stick force in order to comply with Government airworthiness regulations and for reasons of safety.

It is an object of this invention to provide a device which will alter the stick-force vs. speed curve in an aircraft. It is more particularly an object of this invention to provide means by which the trim tab may be deflected to alter pressures upon the stick in the cockpit of an aircraft.

Attempts to correct this problem by mechanical means have proven difficult and complicated. In any system to correct this characteristic, there obviously must be some means to sense changes in air speed and means to deflect the trim tab. It can be readily seen that mechanical means to detect air speed deviations will not supply sufficient force to deflect the trim tab to alter the stick force. Some additional power or force must be inserted in the train of motion from the speed sensor to the trim tab. This complicated mechanism adds additional weight and involves mechanical movements which are apt to malfunction. Another problem of mechanical operation of trim tabs is that there is a delay between the sensing of changes of air speed and deflection of trim tab and the elevator which transmits the force back to the stick. This delay becomes increasingly important as aircraft become faster, especially from a safety viewpoint.

It is thus an object of this invention to provide a means by which the stick-force vs. speed curve may be caused to assume a stable slope by a device which is lighter than mechanical apparatus, which is more accurate than equivalent mechanical means, and is universally adaptable to all aircraft.

It is another object of this invention to provide a means to correct trim tab movements in relation to air speed changes which involve fewer moving parts and it is a further object of this invention to provide a device of the character described which is simpler and more reliable.

Additional advantages and objects of this invention will become evident from the detailed specification and the drawings.

Figure 2:
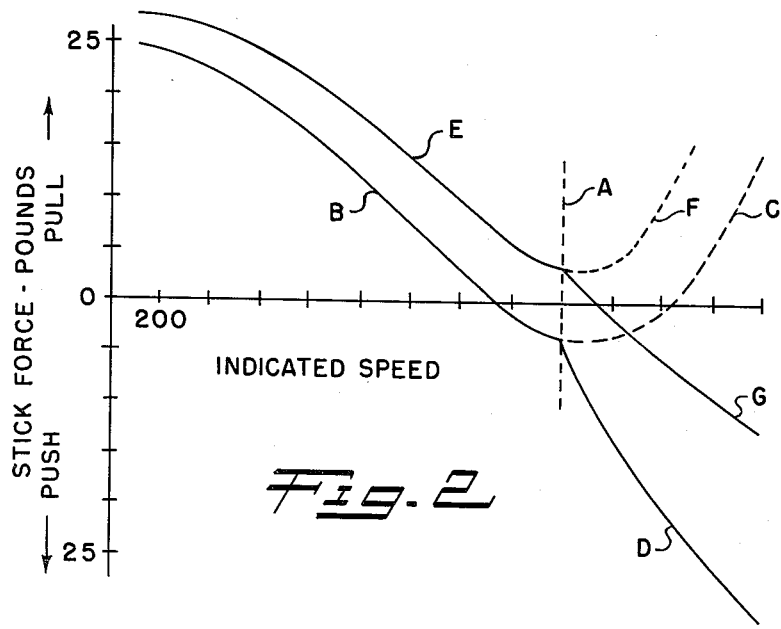
Figure 3:
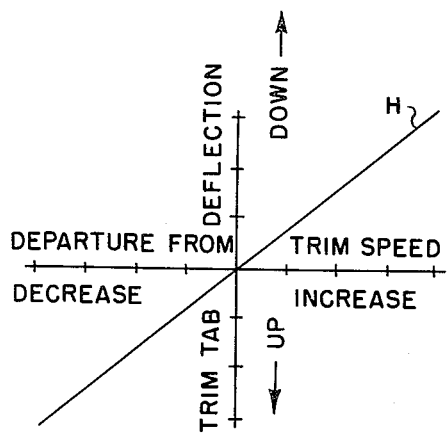
Figure 4:
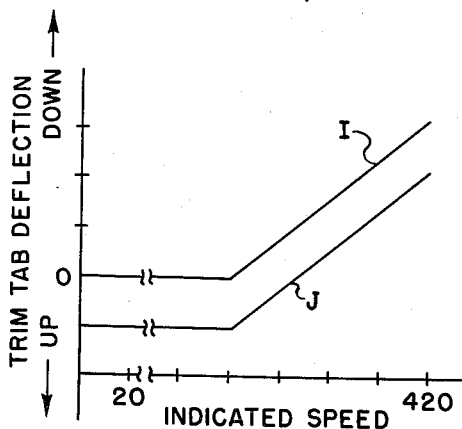

FIGURE 1 shows a simplified block diagram of the system according to the invention, FIGURE 2 shows a typical stick-force vs. velocity characteristic curve for two different trim speeds with a stick force reversal characteristic shown in dotted lines, FIGURE 3 shows trim tab deflection as a function of air speed variation tailored to correct typical characteristics as shown in FIGURE 2, and FIGURE 4 shows typical tab deflection as against indicated air speed for two different trim speeds as effected by the present invention.

The effects of stick-force reversal are graphically demonstrated in FIGURE 2. Curves B—C and E—F represent the forces upon the stick for two different trim speeds of a representative aircraft which does not embody the device according to the present invention. The speed at which the stick-forces begin to reverse is indicated by dashed line A. The trim speed having been defined as that speed at which stick forces are neutral is shown in FIGURE 2 as that speed where curve B—D or E—G first cross the zero force ordinate. Below this speed of force reversal the forces are normal. That is, as speed decreases from trim speed a greater pull is exerted upon the stick. Normally, also, as speed increased from the trim speed a greater push would be expected as shown by curves D and G. However, in those aircraft in which the force reversal characteristic is inherent, curves B—C and E—F represent the forces upon the stick. As speed is increased beyond the point of force reversal, instead of the expected increased push, there is an increased pull upon the stick. If the pilot had no other indication, other than forces on the stick of departure from trim speed, he would feel that, because of the additional pull upon the stick speed was decreasing, while in fact, the forces he was experiencing would be in the area of curve C or F. On reflection it can be seen that, if the aircraft should increase above the force reversal speed, further pull forces are developed on the stick and would move it forward, tending to put the aircraft into a glide or a dive. As these forces increase, the stick would move further forward resulting in downward vertical flight. This condition is intensified by the normal tendency of the pilot to counteract the decrease in speed experienced because stick forces are similar to those of curve B or D by pushing forward on the stick to regain trim speed.

The present invention alters those stick forces by means of trim tab deflection so that the end product is represented by stick-force curves B—D or E—G. In the example presented, stick-forces are normal below the speed of force reversal, the device shown is made operative for only those speeds above. The present invention may be made to alter stick-forces any place in the speed spectrum. FIGURE 3 shows the manner in which the trim tab is deflected, with installation of a device according to the present invention, in order to reflect a stick-force pressure to the cockpit. As speed is increased above trim speed, the trim tab is deflected downwardly a distance proportional to the increase above the trim speed, and for decrease of speed from the trim speed the trim tab is deflected upwardly in proportion to the magnitude of the departure from the trim speed. It can be seen that the greater the departure from trim speed, the larger will be the force experienced upon the stick. Down tab causes push force on the stick and up tab, a pull force. Thus, the larger the deviation above the trim speed the larger the push force that is experienced, and the larger the pull for decrease from trim speed. FIGURE 4 shows the effects on the trim tab. Curves I and J represent approximately the same speeds as represented by curves B—D and E—G in FIGURE 2. From FIGURE 2 it can be seen that below the speed of force reversal A, expected stick forces remain normal. Therefore, there is no tab deflection necessary. This is shown by the horizontal parts of curves I and J in FIGURE 4. The speed of force reversal is represented in FIGURE 4 on curves I and J as the point at which they begin to ascend. Above the speed of force reversal the trim tab is deflected by the device according to the present invention in order to transmit a force to the stick to produce a stable curve such as B—D of FIGURE 2. Curves H, I and J represent deflections from the trim speed position of the tab.

The device which alters the stick-force from that demonstrated by curve B—C to the curve B—D is shown in simplified block form in FIGURE 1. Trim tab 10 is caused to be deflected as a result of changes in air speed as sensed by air speed sensor 11. Air speed sensor 11 produces a voltage which is a function of the sensed air speed. Synchronizer 12 produces a voltage which is exactly opposite to the sum of the voltages produced by sensor 11 and trim tab position sensor 13 (to be later described) when the aircraft is at trim speed. This voltage is applied at summing point 14. Any deviation from the trim speed will cause sensor 11 to produce a different voltage. The result at summing point 14 is an error voltage proportional in magnitude to the deviation and with polarity relative to the direction of the deviation. This error voltage is then applied to amplifier 15, the output of which excites servo motor 16 which deflects tab 10 and results in a change in stick-force in the cockpit.

Considering the operation of the device from the time where the pilot sets a trim speed to the point where deviation from that trim speed deflects tab setting to reflect the change in air speed from the trim speed to the stick in the cockpit, the pilot first adjusts his speed and trims out forces upon the stick by deflecting trim tab surface 10 by rotation of trim wheel 20 or a like device, which, through cable 21 and pulley 22, deflects the trim tab until pressures are neutral. Upon application of force to trim wheel 20, force sensing switch 23 responds to throw switch plate 24 to the left, as seen in FIGURE 1, so that a circuit from power source 25, line 26, contact 27, contact 30, line 31, coil 32 to ground 33 is interrupted, disengaging clutch 34. Therefore, during the period that the pilot is manually trimming the aircraft, the trim servo motor is disconnected. Switch plate 24 of force switch 23 in its left position closes the loop of synchronizer 12. The purpose of synchronizer 12 is to cancel out any voltage which appears at summing point 14 when the aircraft is at trim speed. Any voltage which appears in this circuit is sensed at point 14. That voltage is transmitted through line 36, contact 37, switch plate 24 (in its left position), contact 38, line 40, summing point 57, is amplified by amplifier 41 which causes motor 42 to select a new position on synchro 43 which then produces a voltage which is transmitted back to summing point 14 through line 44. "Synchro" for purposes of this specification is any device such as a potentiometer or variable resistor which produces a voltage relative to a selected mechanical position, in this case by motor 42. The rate of motor 42 in form of a proportional voltage is applied in opposition to that in line 40. This smooths correction and prevents undesirable oscillation of the voltage produced by synchro 43. The operation of synchronizer 12 is nearly instantaneous and its zeroing of the voltage appearing at summing point 14 occurs during application of manual force upon trim wheel 20 no matter how short the duration of the force. Upon release of manual forces on trim wheel 20, force switch 23 returns to the position shown in FIGURE 1 closing the circuit to the coil 32, re-engaging clutch 34 so that trim servo motor 16 is reconnected to trim tab 10 through shaft 45.

Any subsequent change in air speed from the trim speed is sensed by sensor 11, resulting in change in voltage produced as a function of new air speed which appears through line 35 at the input of amplifier 15. The output of amplifier 15 excites trim servo motor 16 which, through clutch 34, rotates shaft 45 and deflects trim tab 10 to a new position. The position of the trim tab is continually sensed by trim tab position sensor 13 which generates a voltage relative to the position of tab 10 which is applied to summing point 14. The voltage generator by trim tab position sensor 13 is zero when the trim tab is in the neutral or faired position. The polarity of the voltage generated by trim tab position sensor 13 is opposite when the trim tab is in the up position to that when it is in the down position. The change in voltage produced the trim tab position sensor 13 as a result of actuation of servo motor 16 is in opposition to the change produced by air speed sensor 11.

The rate at which trim servo motor 16 corrects trim tab 10 is sensed and fed back through line 47. It produces a voltage as a function of the rate of motor 16 which is transmitted through line 50 to summing point 14, in opposition to the voltage produced by air speed sensor 11. The rate of the motor 16 in form of a proportional voltage is applied in opposition to that in line 35. This smooths correction and prevents undesirable oscillation of the shaft 45 rotated through clutch 34 by servo motor 16. This has the effect of stabilizing the system.

The rate of change in air speed in form of a proportional voltage is produced by differentiator 52 from line 53 and applied to summing point 14 in opposition to that in line 35. This smooths correction and prevents undesirable oscillations of actual air speed. The correction also reduces any inherent tendencies of the aircraft to oscillate about the lateral axes.

A review of the operation of the device using exemplary voltages will be helpful. Upon application of force to the pilot's trim wheel 20, the sensing switch 23 is actuated, de-energizing the clutch 34 disconnecting trim servo motor 16 from the trim tab surface 10. The pilot positions the trim tab 10 directly through wheel 20, cable 21 and pulley 22 to establish the desired trim speed. During the manual trim operation, sensing switch 23 closes loop of synchronizer 12 to maintain voltage at summing point 14 (and hence amplifier 15) at a zero level. Assume for example that the new trim speed causes air speed sensor 11 to produce a positive 10 volts. Assume also that trim tab position is neutral so that no voltage is produced by the trim tab position sensor 13. Thus +10 volts appears at summing point 14. The synchronizer 12 senses 10 volts positive in that circuit causing synchro 43 to produce a voltage of 10 volts negative at summing point 14. The net result is a zero voltage at amplifier 15. Upon release of manual forces from trim wheel 20, force switch 23 deactuates, opening the loop of synchronizer 12 and reconnecting trim servo motor 16 to trim tab surface 10 through clutch 34 and shaft 45. Synchro 43 of synchronizer 12 continues to apply a —10 volts to summing point 14. A subsequent change in air speed sensed by sensor 11 produces an error voltage at the input of servo amplifier 16. Output of the servo amplifier 15 excites trim servo motor 16 to drive the trim tab surface 10 through clutch 34 and shaft 45 to a new position. The trim tab position is sensed by trim tab position sensor 13 and its output voltage opposes the command voltage at summing point 14 produced by the air speed sensor 11, so as to reduce the error voltage appearing at the servo amplifier 15. The motion of the trim tab ceases when the error voltage appearing at servo amplifier 15 is reduced to zero. Assume that the air speed is increased so that air speed sensor 11 produces a voltage of +11 volts. Synchronizer 12 continues to produce —10 volts which results in a net difference of +1 volt at summing point 14. This +1 volt is amplified by amplifier 15 exciting trim servo motor 16 to deflect trim tab surface 10 to a position where trim tab position sensor 13 produces a —1 volt to oppose the net +1 volt at summing point 14. At that time the voltage appearing at amplifier 15 will again be zero and trim tab servo motor will no longer be excited. By the same reasoning, should a decrease from trim speed cause sensor 11 to produce only +9 volts, which is opposed by the fixed negative 10 volts from synchronizer 12, there would be a resultant net negative voltage of 1 volt appearing at amplifier 15. The trim tab would be deflected to a position where trim tab position sensor produces a +1 volt to oppose the —1 volt at summing point 14 at which time amplifier 15 would no longer produce an output because the voltage input would be zero.

The device according to the present invention further facilitates compliance with another Government airworthiness requirement set out in 14 CFR 4b.151(b) that the air speed shall return to within 10% of the original trim speed when the control force is slowly released from any speed. It can be seen from observation of curve B—C of FIGURE 2 that without trim compensation, should the air speed increase above the point of force reversal, release of the stick will not cause return to original trim speed but will cause continuation of the increase to a dive condition. Thus it is necessary to have a trim compensation device to correct this undesirable characteristic. It can be seen from FIGURE 3 that when a device according to the present invention is installed, as speed is increased the trim tab will be deflected downwardly, causing up deflection of the elevator surface which results in an increase in attitude of the aircraft. The increased attitude of the aircraft will tend to return it to the trim speed.

Another useful product of a device according to the present invention is that changes in the center of gravity, in reality a change in the trim condition, will be compensated so that there is a tendency to return to the manually set trim speed. Suppose, for example, that a passenger in an aircraft walks aft, resulting in increased attitude of the aircraft tending to slow the aircraft. The decrease in speed will be sensed by air speed sensor 11 which will cause the trim tab to deflect in a direction to cause an increase in speed toward trim speed. However, the purpose of the present device is not as an automatic trim device but to compensate for deficiencies in the stick-force curve vs. speed characteristics of an aircraft.

The purpose of the invention is to alter the stick-force curve vs. speed so that there will be a stable slope and that the pilot will be able to recognize deviations from trim speed through changes in force upon the stick. Thus, as speed is decreased from trim speed, additional pull will be experienced and as it is increased from trim speed additional push will be experienced. In achieving this objective the device additionally complies with the requirement that the air speed shall return to within 10% of the original trim speed when the control force is slowly released from any speed.

A specification application of the trim compensator circuit is shown and described herein for purposes of illustration rather than limitation and it is to be understood that certain alterations, modifications and substitutions may be made to the present disclosure without departing from the invention as defined by the spirit of the appended claims.

What is claimed is:

1. In an aircraft equipped with a trim tab, a device to alter the stick force vs. velocity characteristics of an aircraft by trim tab displacements, comprising means to sense deviations from a trim speed, means to produce an error voltage proportional to the magnitude and with polarity relative to deviations from said trim speed, means powered by said error voltage to displace said trim tab in a direction relative to said polarity and at a rate and distance proportional to the said magnitude of said error voltage, pilot operated means to set a trim speed, means responsive to operation of said pilot operated means to make inoperative said means powered by said error voltage so that the trim tab is under exclusive control of said pilot operated means during the time that the pilot operates said means.

2. In an aircraft having a trim tab, a device to alter the stick-force vs. velocity characteristics of an aircraft by trim tab displacements comprising means to sense air speed, means to produce a voltage proportional to said air speed, means responsive to deviations in air speed to produce an error voltage proportional to the magnitude and with polarity relative to said deviations in air speed, means powered by said error voltage to displace said trim tab in a direction relative to said polarity and at a rate and distance proportional to said magnitude of said error voltage, pilot operated means to set a trim speed, means responsive to operation of said pilot operated means to make inoperative said means powered by said error voltage, and further means responsive to operation of pilot operated means to sense said voltage proportional to said air speed and produce a voltage in opposition to said voltage proportional to said air speed.

3. In an aircraft having a trim tab, a device to alter the stick-force vs. velocity characteristics of said aircraft by trim tab displacements comprising means to sense air speed, means to produce a voltage in proportion to the magnitude of said air speed, servo means to deflect said trim tab, means to sense the position of said trim tab, means to produce a voltage relative to the position of the trim tab which is proportional to the magnitude of deflection of said trim tab from a neutral position and varying in polarity relative to the direction of said deflection from said neutral position, manual means to set a trim speed, means responsive to actuation of said manual means to produce a voltage equal but opposite in polarity to the sum of the said voltage proportional to said air speed and the said voltage relative to said position of said trim tab during actuation of said manual means, means to maintain said last named voltage fixed after de-actuation of said manual means, means to apply all previously named voltages to a single summing point so that the sum will equal zero during actuation of manual means, means to apply any deviations or error voltage at said summing point resulting from changes in air speed from said trim speed to said servo means to deflect said trim tab so that said trim tab is deflected a distance relative to the magnitude and in a direction relative to the polarity of said error voltage.

4. In a device having a control to alter a variable condition of the device in relation to its environment, means to sense the condition, means to produce a voltage proportional to the magnitude of said condition, means to alter said control, means to sense the state of said control, means to generate a voltage having a magnitude proportional to the magnitude of deviation and having a polarity relative to the direction of deviation from a neutral state, manual means to set a desired state of said condition, means responsive to actuation of said manual means to produce a voltage equal to but opposite in polarity to the sum of the said voltage relative to the condition of said device and the said voltage relative to the state of said control, means to maintain said last named voltage fixed after de-actuation of said manual means, means to apply all previously named voltages to a single summing point so that the sum will be equal to zero during actuation of said manual means, means to apply any deviation or error in voltage at such summing point resulting from changes in environmental condition of the device from the condition of actuation of said manual means to said means to alter said control so that said control is altered in the amount relative to the magnitude and in a direction relative to the polarity.

5. In an aircraft equipped with a trim tab, a device to alter the stick-force vs. velocity characteristics of said aircraft by trim tab displacements comprising means to sense air speed, means to produce a voltage in proportion to the magnitude of said air speed, servo means to deflect said trim tab, means to sense the position of said trim tab, means to produce a voltage relative to the position of the trim tab which is proportional to the magnitude of the deflection of said trim tab from a neutral position and varying in polarity relative to the direction of said deflection from said neutral position, manual means to set a trim speed, means responsive to actuation of said manual means to produce a voltage equal but opposite in polarity to the sum of the said voltage proportional to said air speed and the said voltage relative to said position of said trim tab during actuation of said manual means, means to maintain said last named voltage fixed after de-actuation of said manual means, means to sense and produce a voltage proportional to the rate at which said voltage proportional to said air speed is produced, means to sense and produce a voltage proportional to the rate of said servo means, means to apply all previously named voltages to a single summing point, means to apply any deviation or error voltage at said summing point resulting from change in air speed from said trim speed to said servo means to deflect said trim tab so that said trim tab is deflected a distance relative to the magnitude and in a direction relative to the polarity of said error voltage.

References Cited in the file of this patent

UNITED STATES PATENTS

| | | |
|---|---|---|
| 2,352,878 | Meredith | July 4, 1944 |
| 2,620,150 | Atwood et al. | Dec. 2, 1952 |
| 2,770,429 | Schuck | Nov. 13, 1956 |
| 2,957,652 | Masel | Oct. 25, 1960 |